US010963842B1

(12) United States Patent
Resheff et al.

(10) Patent No.: US 10,963,842 B1
(45) Date of Patent: Mar. 30, 2021

(54) COMMUNICATION PLATFORM FOR EMAIL MANAGEMENT

(71) Applicant: Intuit Inc., Mountain View, CA (US)

(72) Inventors: Yehezkel Shraga Resheff, Jerusalem (IL); Talia Tron, Hod HaSharon (IL); Tzvika Barenholz, Hod HaSharon (IL); Yair Horesh, Kfar-Saba (IL)

(73) Assignee: Intuit Inc., Mountain View, CA (US)

( * ) Notice: Subject to any disclaimer, the term of this patent is extended or adjusted under 35 U.S.C. 154(b) by 71 days.

(21) Appl. No.: 16/446,939

(22) Filed: Jun. 20, 2019

(51) Int. Cl.
G06F 15/173 (2006.01)
G06Q 10/10 (2012.01)
G06F 16/906 (2019.01)
H04L 12/58 (2006.01)

(52) U.S. Cl.
CPC ......... G06Q 10/107 (2013.01); G06F 16/906 (2019.01); H04L 51/22 (2013.01)

(58) Field of Classification Search
CPC ...... G06Q 10/107; G06F 16/906; H04L 51/22
See application file for complete search history.

(56) References Cited

U.S. PATENT DOCUMENTS

| 8,364,467 | B1* | 1/2013 | Bowman | G06F 40/279 704/9 |
| 8,583,654 | B2* | 11/2013 | Palay | G06F 16/3344 707/741 |
| 2008/0109448 | A1* | 5/2008 | Aboel-Nil | G06Q 10/107 |
| 2008/0250106 | A1* | 10/2008 | Rugg | G06Q 10/107 709/206 |
| 2011/0288962 | A1* | 11/2011 | Rankin, Jr. | G06Q 30/02 705/27.1 |
| 2011/0289106 | A1* | 11/2011 | Rankin, Jr. | G06F 16/284 707/769 |
| 2011/0289161 | A1* | 11/2011 | Rankin, Jr. | G06Q 10/107 709/206 |
| 2019/0080115 | A1* | 3/2019 | Dongre | G06F 21/6227 |

* cited by examiner

Primary Examiner — Thanh T Nguyen
(74) Attorney, Agent, or Firm — Ferguson Braswell Fraser Kubasta PC

(57) ABSTRACT

One or more embodiments includes storing a group email message in multiple email mailboxes to obtain multiple stored email messages, receiving, for a first stored email message in the stored email messages, an updated label from a first user computing device, detecting, in response to receiving the updated label, that the stored email messages matches the first stored email message, and storing the updated label with at least a subset of the stored email messages. The method further includes transmitting, with the updated label and to a second user computing system, a second stored email message in the stored email messages.

20 Claims, 10 Drawing Sheets

Reply | Reply All | Forward
Thu 11/8/2018 11:09 PM
ABC <ABCinfo.com>
Announcing Docker Enterprise 2.1
To Doe, John
Click here to suggest "community spam" — 704

Unsubscribe

Announcing Docker Enterprise 2.1 | View online

Announcing Docker Enterprise 2.1

We are excited to announce the release of Docker Enterprise 2.1 the next leap forward for the leading container platform in the industry and the only one designed for both Windows and Linux apps.

NEW features in Docker Enterprise 2.1 deliver:

- Increased performance & compatibility for Windows Apps
- Greater insights and serviceability with new out-of-the-box dashboards
- Enhanced security & compliance With Docker Enterprise 2.1, and our best-in-class, industry-tested tools and services in our NEW Windows Server application migration program, organizations get the best platform for securing and modernizing Windows Server applications, while building the foundation for continuous innovation across any application, delivered anywhere.

Learn More

Reply  Reply All  Forward
Thu 11/8/2018 11:09 PM
ABC <ABCinfo.com>
Announcing Docker Enterprise 2.1
To: Doe, John About to be declared as "community spam", actually important, good idea ← *804*

Unsubscribe

*802*

Announcing Docker Enterprise 2.1 | View online

Announcing Docker Enterprise 2.1

We are excited to announce the release of Docker Enterprise 2.1 the next leap forward for the leading container platform in the industry and the only one designed for both Windows and Linux apps.

NEW features in Docker Enterprise 2.1 deliver:

- Increased performance & compatibility for Windows Apps
- Greater insights and serviceability with new out-of-the-box dashboards
- Enhanced security & compliance With Docker Enterprise 2.1, and our best-in-class, industry-tested tools and services in our NEW Windows Server application migration program, organizations get the best platform for securing and modernizing Windows Server applications, while building the foundation for continuous innovation across any application, delivered anywhere.

[Learn More]

*FIG. 8*

| Members | Leaders | Misses 30 Days | Method | Action | Recent Closed Emails | Dismantle Group |
|---|---|---|---|---|---|---|
| Kyle, Iris, Moo (and 10 others) | Moo, Tami | 0 (0%) | Merit | Weekly concatenation | here | ☐ |
| Kelly, Sarah, Xei, Yo, Xie, Lee, David (and 15 others) | | 23 (89%) | 1 Decided | Deleted + Slack subject line with ink | here | ☐ |

FIG. 10

COMMUNICATION PLATFORM FOR EMAIL MANAGEMENT

BACKGROUND

Email messaging offers some benefits of enabling multiple concurrent threads of communications between the same users, allowing users to view and respond to an email message long after the email message was sent and delivered, and providing a static record of a communication. With these benefits, email messaging is one of the most prevalent forms of communication. Because of the prevalence, however, users may be inundated with email messages. Each email message has a storage cost to the server and the user computing device storing the email. Further, each email message has a time cost to the user in the form of time spent opening the message, reading the body (i.e., contents) of the email, and, optionally, performing an action based on the email. Thus, while email messaging has benefits leading to the prevalence of email messaging, the time and storage costs can be detrimental when factoring the number of email messages that a user receives.

One type of email message is a group email message. In a group email message, a single sender sends an email that is directed to multiple destination email addresses. In contrast to other messaging platforms, in an email platform, a group email message is treated as multiple individual messages that are individually managed. Thus, the time cost and storage cost are increased by the number of destination email addresses.

SUMMARY

In general, in one aspect, one or more embodiments relate to a method that includes storing a group email message in multiple email mailboxes to obtain multiple stored email messages, receiving, for a first stored email message in the stored email messages, an updated label from a first user computing device, detecting, in response to receiving the updated label, that the stored email messages matches the first stored email message, and storing the updated label with at least a subset of the stored email messages. The method further includes transmitting, with the updated label and to a second user computing system, a second stored email message in the stored email messages.

In general, in one aspect, one or more embodiments relate to a non-transitory computer readable medium includes computer readable program code for a graphical user interface. The graphical user interface includes a list of multiple email messages in a first email mailbox, the email messages includes a group email message directed to multiple destination email addresses. The first email mailbox is assigned a first destination email address of the destination email addresses. The graphical user interface further includes a label field assigned, in the graphical user interface, to the group email message, and instructions for updating the label field with an updated label received from a second email mailbox. the second email mailbox is assigned a second destination email address of the destination email addresses.

In general, in one aspect, one or more embodiments relate to a system that includes a computer processor, a data repository storing multiple email mailboxes, the email mailboxes includes a first email mailbox and a second email mailbox, and a transport service configured to execute on the computer processor and access the data repository. The transport service configured to store a group email message in multiple email mailboxes to obtain multiple stored email messages. The system further includes a client access service configured to execute on the computer processor and access the data repository. The client access service configured to receive, for a first stored email message in the stored email messages, an updated label from a first user computing device, detect, in response to receiving the updated label, that the stored email messages as matches the first stored email message, store the updated label with at least a subset of the stored email messages, and transmit, with the updated label and to a second user computing system, a second stored email message in the stored email messages.

Other aspects of the invention will be apparent from the following description and the appended claims.

BRIEF DESCRIPTION OF DRAWINGS

FIG. 7, FIG. 8, FIG. 9, and FIG. 10 show examples in accordance with one or more embodiments.

DETAILED DESCRIPTION

Figure 1:
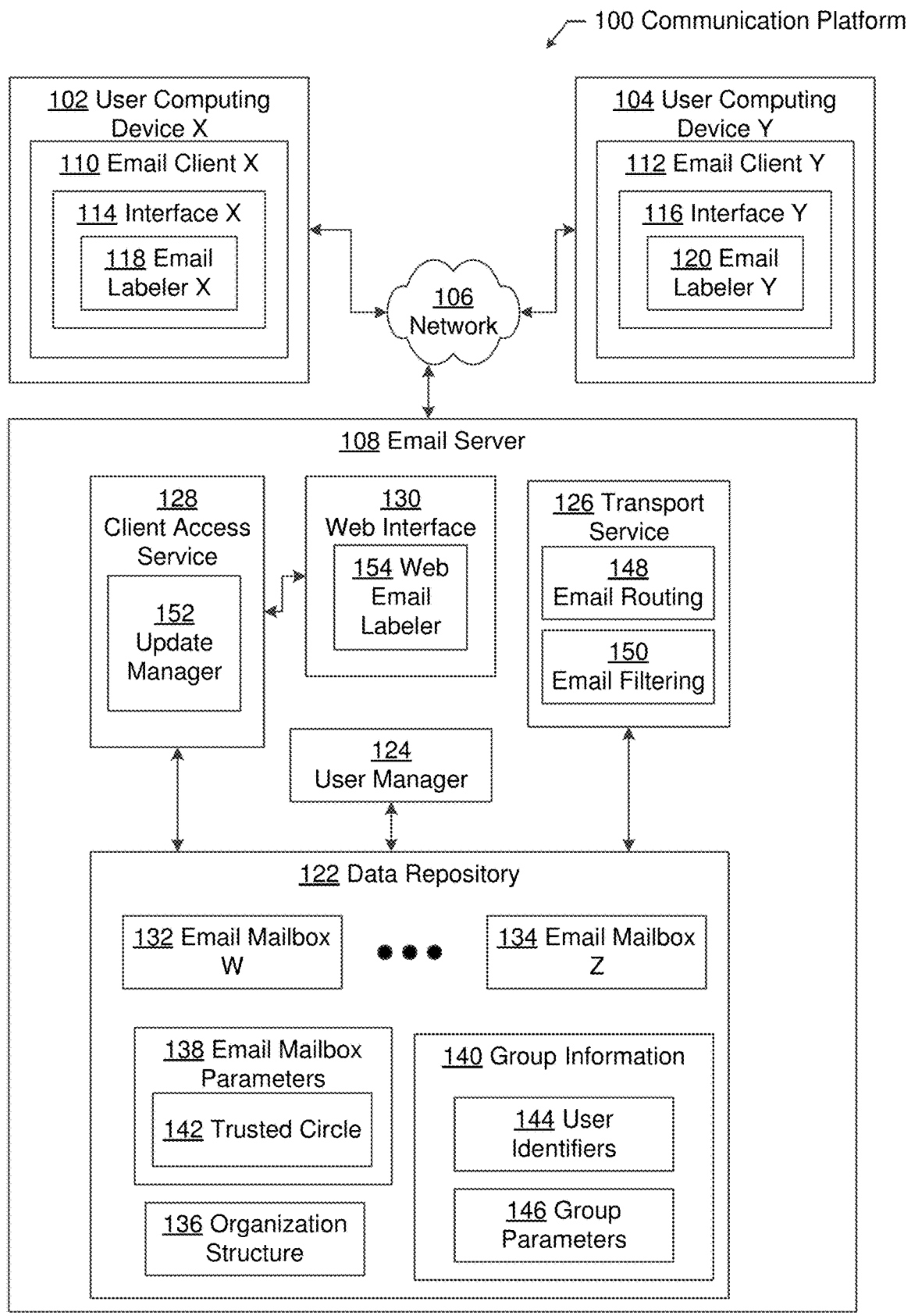
FIG. 1 shows a schematic diagram of a communication platform in accordance with one or more embodiments.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the invention are directed to a communication platform for email management. In particular, in a general email messaging platform, group email messages are managed individually even though the group email message is directed to multiple destination email addresses corresponding to multiple mailboxes. One or more embodiments provide a communication platform whereby each group email message is related to a label in each of the multiple email mailboxes. If the label is updated in one of the email mailboxes after storing the email message in the email mailbox, the updated label is propagated to at least a subset of the other email mailboxes. For example, the label may indicate that the email is spam, or that the email is low importance or irrelevant. By way of another example, the label may indicate that an action requested, in the email message, to be performed is complete. By adding labels, cost savings may exist in the form of storage savings when the group emails are quickly deleted.

From a user perspective, sifting through emails is a substantial time consumer for many individuals in most organizations. Emails sent on a wide bases adversely affect productivity not only by consuming time, but also due to the cost of interruptions, and context switching. One or more embodiments create an email platform for delegating and rule constructing on a community, or organization structure, to help save time for the individual that would otherwise have to open and read each email.

For instance, a manager may be able to mark a widely sent email as irrelevant. In response, the communication platform moves the email to a lower priority folder. Such action may occur when a notice about a sub-system is sent to an entire company and is not relevant to entire departments of the company that do not use the sub-system.

In some embodiments, a "trusted circle" may be defined or learned. The trusted circle is a group of three or more users, where if any user (or a minimum number of users) marked an email as spam, then the group email message will likewise be moved into the less important folder.

FIG. 1 shows a diagram of a communication platform (100) in accordance with one or more embodiments of the invention. As shown in FIG. 1, the communication platform (100) includes multiple user computing devices (e.g., user computing device X (102), user computing device Y (104)) connected via a network (106), to an email server (108). The user computing device and network may be the same or similar to the computing device and network, respectively, described below with reference to FIG. 11A and FIG. 11B. The email server (108) may be a physical server computing device or execute on a physical server computing device, such as the computing device described below with reference to FIG. 11A and FIG. 11B.

The user computing devices (e.g., user computing device X (102), user computing device Y (104)) may include an email client (e.g., email client X (110), email client Y (112)). An email client is a local computer program, which executes on the user computing device, and is configured to access and manage a user's email messages. The email client may be configured to manage email for a single email mailbox or for multiple email mailboxes, described below). The email client may be configured to locally store all or a subset of the email messages obtained from the email server (108). Further, the email client may be configured to send updates to the email server (108). For example, the updates may be with respect to the label related to the email message, the location of the email message, the creation and/or deletion of email messages, the request to move email messages to different folders, etc.

The email client (e.g., email client X (110), email client Y (112)) includes an interface (e.g., interface X (114), interface Y (116)) having an email labeler (e.g., email labeler X (118), email labeler Y (120)). The interface (e.g., interface X (114), interface Y (116)) is a communication interface and may include an application programming interface (API) and a graphical user interface (GUI). In other words, the interface is the set of instructions by which the email client communicates with the email server (108) and the user.

The email labeler (e.g., email labeler X (118), email labeler Y (120)) is configured to assign one or more labels to a corresponding email message, display a current label, and update the email server (108) with the label. In one or more embodiments, the email labeler includes a label field assigned in the interface to a group email message. The label field is discussed in further detail in FIG. 3. The email labeler (118) further includes software instructions for updating the label both in the email client and in the email server.

Returning to the user computing device, the user computing devices are communicatively connected to the email server (108). The email server (108) may include a data repository (122), a user manager (124), transport services (126), client access service (128), and a web interface (130). Each of these components is described below.

In one or more embodiments of the invention, the data repository (122) is any type of storage unit and/or device (e.g., a file system, database, collection of tables, or any other storage mechanism) for storing data. Further, the data repository (122) may include multiple different storage units and/or devices. The multiple different storage units and/or devices may or may not be of the same type or located at the same physical site. The data repository (122) includes functionality to store email mailboxes (e.g., email mailbox W (132), email mailbox Z (134)), an organization structure (136), email mailbox parameters (138), and group information (140).

An email mailbox (e.g., email mailbox W (132), email mailbox Z (134)) is storage space for storing email messages and information about email messages. The email mailbox may be referred to as an email account. Each email mailbox may be assigned a destination email address. The destination email address is a unique identifier of the email account. As used throughout this description, a source email mailbox is the email mailbox that is a recipient of a group email message and is a source of an updated label for the group email message. More particularly, one of the destination addresses of the group email message identifies the source email mailbox. A user accessing the source email mailbox updates the label for a particular group email message in the source email mailbox. Thus, the source email mailbox become the source of the updated label for at least that group email message. Correspondingly, the target email mailboxes are the other recipients of the group email message that may receive the updated label. Specifically, the target email mailboxes also are identified by the destination email addresses of the group email message. The target email mailboxes may have the group email message and may receive the updated label as described below.

Users of the communication system (100) may be assigned one or more email mailboxes for the user. Thus, the destination email address may identify the email mailbox, and also the particular user or users to which the email message is directed. Further, the email mailboxes (e.g., email mailbox W (132), email mailbox Z (134)) in the data repository (122) may be for users of a particular business organization. For example, the business organization may be a company, a nonprofit organization, a corporation, or other organization. As shown in FIG. 1, the data repository (122) includes functionality to store an organization structure (136) for the business organization. The organization structure (136) may store unique user identifiers for each user and the relationships between users with respect to the business organization. In other words, the organization structure (136) defines the personnel hierarchy of the business organization, whereby employees, contractors, and/or volunteers are assigned a user identifier, and the relationship between the user identifiers in the organization structure denotes a managerial relationship between corresponding users. For example, the organization structure (136) may store a first user identifier and a subordinate link to a second user identifier in order to denote that the user corresponding to the first user identifier is a subordinate of the user corresponding to the second user identifier.

Returning to the email mailboxes, each email mailbox is related to email mailbox parameters (138). In other words, a set of email mailbox parameters may be defined for a particular email mailbox. The email mailbox parameters (138) define rules for automatic management of the corresponding email mailbox. For example, the email mailbox parameters may specify routing and filtering rules to automatically apply for at least one email mailbox. The email mailbox parameters may further specify labeling rules. A labeling rule defines an action to take in a target email mailbox when an updated label is received. In one or more embodiments, the labeling rule uses as input, an identifier of the user that updated the label. For example, the identifier of the user may be the identifier of the source email mailbox of the user, the role of the user (i.e., within the organization structure) of the source email mailbox, the destination email address, the user identifier discussed above, or another identifier. Another input to a labeling rule may be the type of email, the number of destination addresses on the email, whether the group email is sent to a group alias or the individual email addresses were explicitly specified in the group email message, and other such input. The output of the labeling rule is the action to perform in the target email mailbox when an updated label is received for the input. For example, the output of the labeling rule may be to move the email to a new folder (e.g., a spam folder, a deletion folder, a high importance folder), to ignore the updated label, to generate a tally based on the number of users that vote on the updated label, to update the label in the target email mailbox, or to perform another action.

The email mailbox parameters (138) may include a trusted circle. A trusted circle (138) is a collection of source email mailboxes that may update the label of the target email mailbox. For example, the trusted circle may be explicitly defined by the user of the target email mailbox. By way of another example, the trusted circle may be learned through machine learning. Further, the trusted circle may be mutual (e.g., a mutual trust between two users of different email mailboxes) or single directional.

Continuing with FIG. 1, the data repository (122) includes group information (140). Group information (140) is information that relates to a group of email mailboxes as a whole. Multiple groups may exist, whereby some of the groups may be overlapping. For example, the group may include the business organization as a whole while another group defines a department, and another group is a collection of email mailboxes of users working on a same project. For example, group information (140) may include group parameters (146) and user identifiers (144). The user identifiers (144) relate users to corresponding email mailboxes and to a group. The group parameters (146) may further include similar rules as the filtering, routing, and labeling rules described above with respect to the email mailbox parameters (138). In particular, the filtering, routing, and labeling rules may be applied to the entire group of email mailboxes. By way of an example, one group of email mailboxes may have that a voting scheme is used to determine whether a group email message is spam, while another group may have that the email message is labeled as spam when a single user views the email message.

The data repository (122) is connected to a user manager (124). The user manager (124) is configured to manage user relationships with respect to each other and email mailboxes. For example, the user manager is configured to create a trusted circle and groups based on information from the organization structure (136) and the email mailbox. Further, the user manager (124) may further be configured to create email mailboxes and relate the email mailboxes to user identifiers.

A transport service (126) is communicatively connected to the data repository (122) in order to store data to the data repository (122) and retrieve data from the data repository (122). For incoming email messages (i.e., email messages to be stored in the data repository (122)), the transport service (126) includes email routing (148) and email filtering services (150). The email routing services (148) may include resolving one or more group email alias addresses to obtain multiple destination email addresses, identify the email mailboxes corresponding to the destination email addresses, and store copies of the group email message in the corresponding identified destination email mailboxes. The email filtering (150) includes functionality to perform filtering and storage operations for new email messages based on one or more email mailbox parameters and/or group parameters.

The transport service (126) may further include functionality to route outgoing email messages. The outgoing email messages are from an email mailbox in the data repository and may be to another email mailbox in the data repository or to an external email mailbox.

A client access service (128) is communicatively connected to the data repository (122) in order to store data to the data repository (122) and retrieve data from the data repository (122). The client access service (128) includes functionality to provide access to the email mailboxes to the email client (e.g., email client X (110), email client Y (112)) and to the web interface (130). The client access service (128) includes an update manager (152). The update manager (152) is configured to receive an update of a label from a source email mailbox, obtain email mailbox parameters, and group information, and update the corresponding label of the target email mailboxes based on the email mailbox parameters.

A web interface (130) is connected to the client access service. The web interface (130) may be a web application for connecting a user computing device to the email mailbox. For example, the web interface (130) may be similar to the email client but executed remotely and available via a web browser. The web interface (130) includes a web email labeler (154). The web email labeler (154) is the same or similar to the email labeler described above with reference to the email client. In particular, the email labeler is configured to receive, and update labels assign to email mailboxes.

Although not shown in FIG. 1, the user manager, update manager, and interface may be defined as plugin to an existing email messaging platform. For example, the existing email messaging platform may be Microsoft Exchange Server® Software, which is connected to an Outlook® email client. Microsoft Exchange Server® and Outlook® are registered trademarks of Microsoft Corporation, located in Redmond, Wash. One or more embodiments may be implemented as a plugin to the Outlook® email client.

Figure 2:
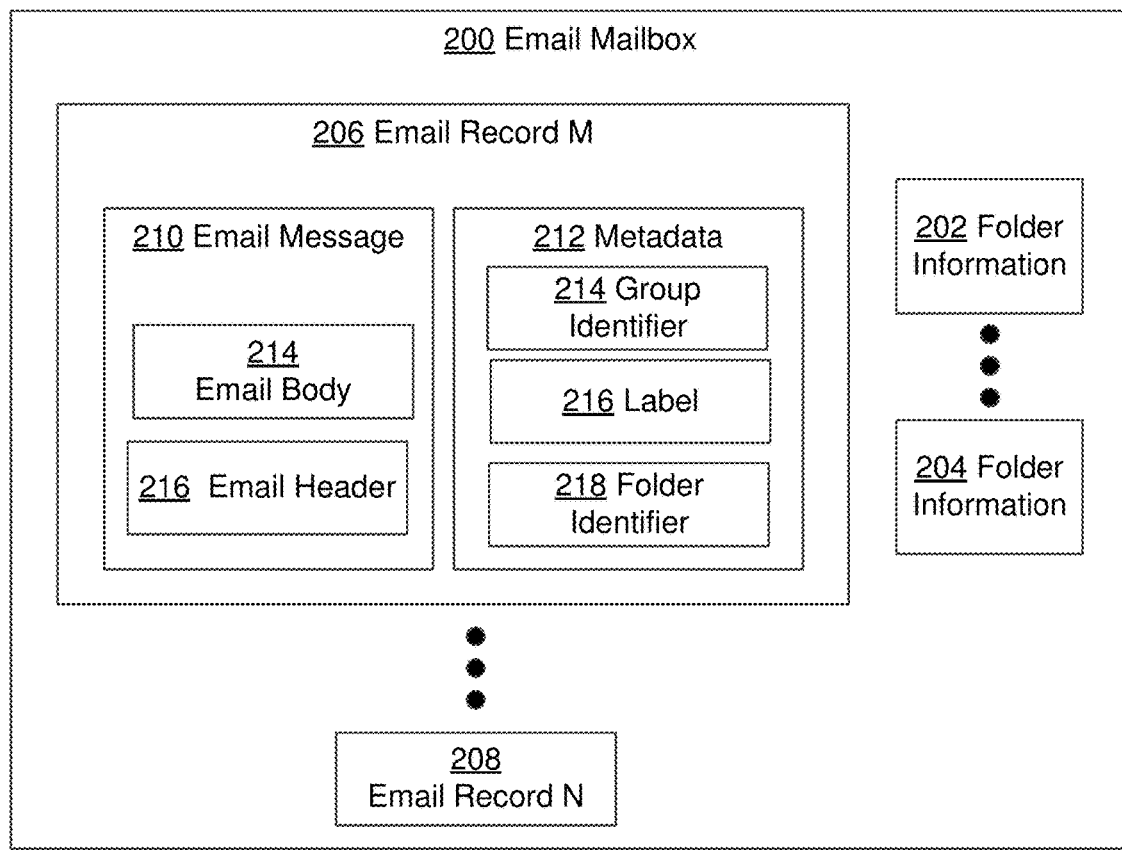
FIG. 2 shows a schematic diagram of an email mailbox in accordance with one or more embodiments.

FIG. 2 shows a schematic diagram of an email mailbox in accordance with one or more embodiments. Email mailbox (200) may include multiple folders. A folder is a virtual construct that provides for a system for organizing emails. For example, in the folder for an email mailbox, a separate folder may exist for an inbox, spam, deleted mail, sent mail, etc. Further each of the aforementioned folders may have subfolders. Each folder includes corresponding folder information (e.g., folder information (202), folder information (204)). The folder information may include a folder identifier, retention policy, rules for emails in the folder, and other information.

The email mailbox (200) include multiple email records (e.g., email record M (206), email record N (208)). Each email record is an entry for a single email message. As shown by email record M (206), an email record includes an email message (210) and metadata (212). The email message (210) is the message that is processed by the transport service. The email message (210) includes an email body (214) and the email header (216). The email body (214) is the main part of the email message and includes, the text, images, and any attachments. The email header (216) includes routing information, such as sender email address, destination email address, subject, date/timestamp, and other information. Some email messages in the input may be group email addresses that explicitly or implicitly identify multiple destination email addresses.

In the data repository, described above with reference to FIG. 1, additional metadata (212) is related to the email message (210). In other words, the metadata (212) is linked in storage to the email message (210). The additional metadata is information that is created by the communication framework for the email message (210). The metadata (212) includes a group identifier (214) of a group, a label (216), and a folder identifier (218) of the folder in which the email is located. The group identifier (214) relates the group to the email message (210). The group may be a subgroup of the destination email addresses for a group email. Multiple labels (216) may be related to the same email message (210). Below are a few examples of labels for an email message.

A label (216) for the email message (210) may be a recipient defined importance level for the email message (210). For example, the importance level may be high priority, medium priority, or normal priority. Specifically, rather than the importance level being defined by the sender of the email message, which may be concurrently in the email header (216), the label (216) stores an importance level defined by another recipient of the email message. The other recipient is another user that received, and did not send, the email message. For example, for the group email, the other recipient is a user corresponding to another email mailbox (i.e., not email mailbox (200)) identified by a destination email address that is identified in the group email message (210).

A label (216) for the email message (210) may be whether the email message (210) is spam or not as defined by another recipient, as defined above. The label may be a vote of another recipient (e.g., as to the importance level or whether the email is spam or not spam). The label may include tallies of votes by multiple recipients. The label may include recipient identifiers of the recipients that provide the label.

The label may be whether or not an action is performed. For example, the email may be a request to perform an action. An initial label may be automatically applied to the email that the action is not performed. Another recipient may update the label that the action is performed once the other recipient performs the action.

Other types of labels defined by other recipients may be used without departing from the scope of the invention.

Figure 3:
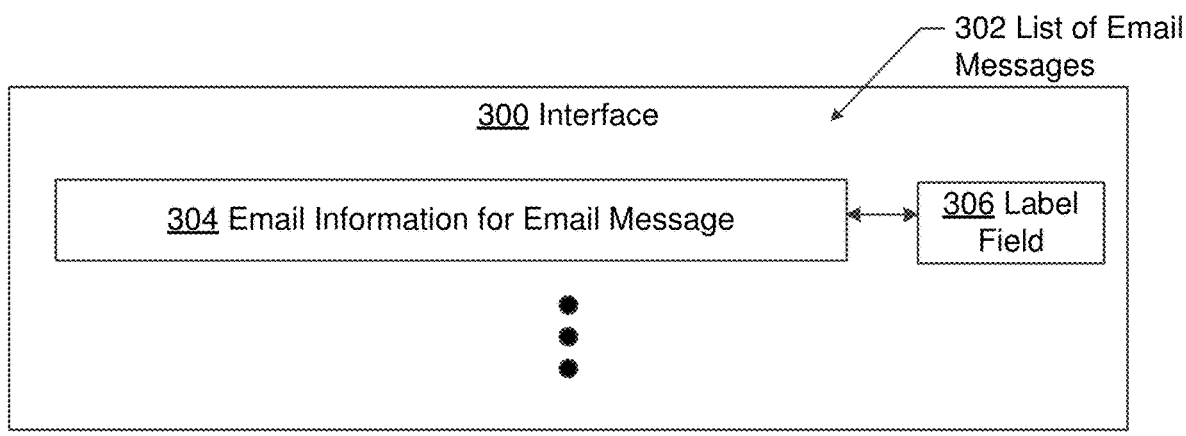
FIG. 3 shows a schematic diagram of an interface in accordance with one or more embodiments.

Turning to FIG. 3, FIG. 3 shows an example schematic diagram of an interface (300), such as the GUI described above with reference to FIG. 1. The interface (300) may display a list of email messages (302). In some cases, users experience hundreds of new email messages in a list at a time. Such users may have the hundreds of new email messages on a daily basis or when returning from vacation. Not all email messages are of equal importance at the time in which the email message is in the list, or even require input by the user. Further, some email messages may be ignored and even deleted. Nevertheless, such email messages have storage and time cost.

In the list of email messages (302), email information (304) for an email message is related to a corresponding label field (306) that shows a current label for the email message. The email information (304) may be any portion of the email message including the email body and email header. The label field (306) is visually related to the email information, such as by using lines, positioning, and other GUI elements. The label field may include buttons, drop down boxes, or other interface widgets for labeling an email message. By including labels, a user may quickly determine whether an email requires the user's attention.

In some embodiments, email messages, when labeled by another recipient or a threshold number of other recipients, are moved to a different folder, such as a spam folder or a deleted item folder. In such a scenario, such email message may be displayed in the list of the email messages that are in a different folder. As described above, the inbox of the user may thus have much fewer than the hundreds of emails. This may include a time and storage savings by not have such emails in the user's vision and by deleting such emails according to a faster deletion polity of the other folders.

While FIGS. 1-3 show a configuration of components, other configurations may be used without departing from the scope of the invention. For example, various components may be combined to create a single component. As another example, the functionality performed by a single component may be performed by two or more components.

Figure 4:
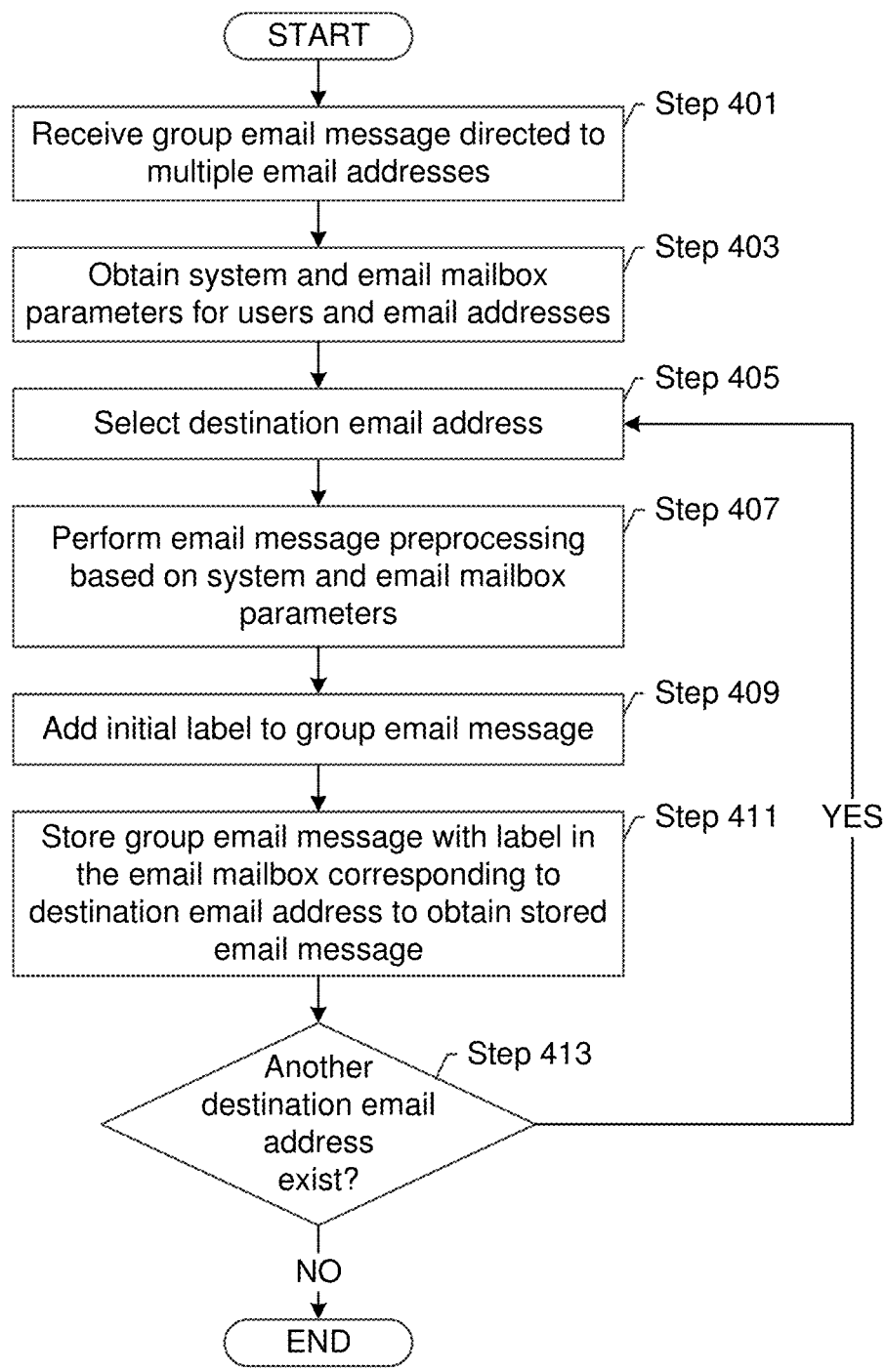
FIG. 4, FIG. 5, and FIG. 6 show flowcharts in accordance with one or more embodiments.
Figure 5:
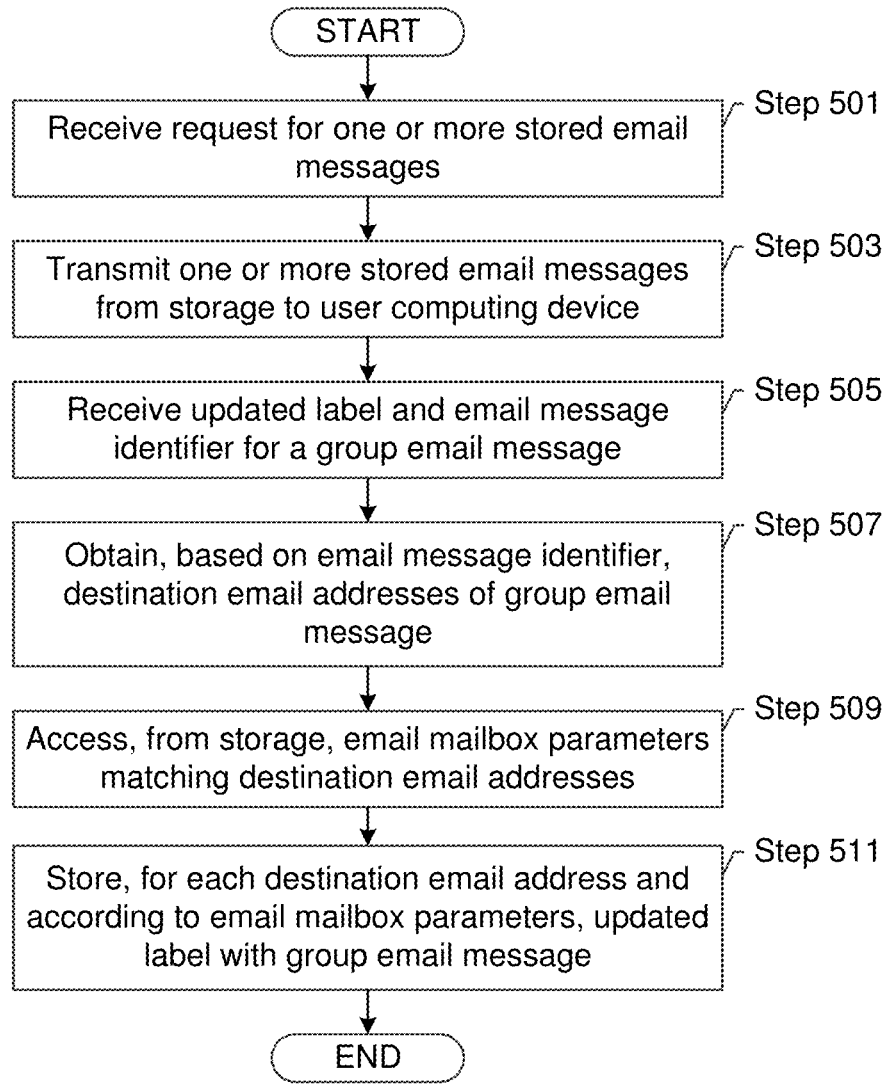
Figure 6:
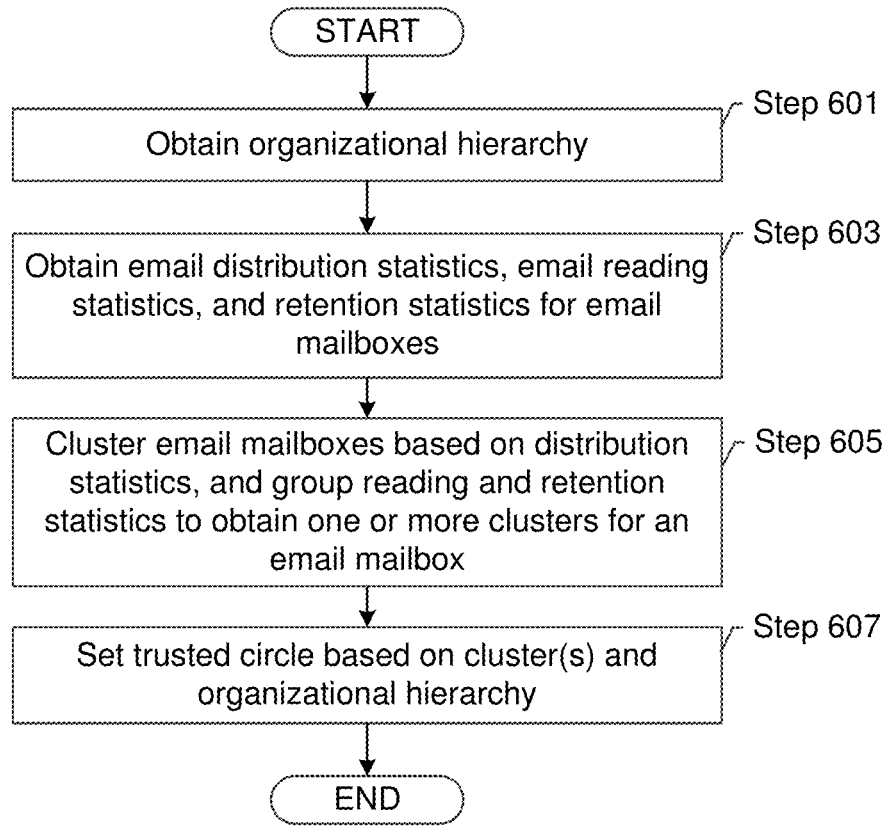

FIGS. 4-6 show flowcharts in accordance with one or more embodiments. While the various steps in these flowcharts are presented and described sequentially, one of ordinary skill will appreciate that some or all of the steps may be executed in different orders, may be combined or omitted, and some or all of the steps may be executed in parallel. Furthermore, the steps may be performed actively or passively. For example, some steps may be performed using polling or be interrupt driven in accordance with one or more embodiments of the invention. By way of an example, determination steps may not require a processor to process an instruction unless an interrupt is received to signify that condition exists in accordance with one or more embodiments of the invention. As another example, determination steps may be performed by performing a test, such as checking a data value to test whether the value is consistent with the tested condition in accordance with one or more embodiments of the invention.

FIG. 4 shows a flowchart for the email server to receive and process a new group email message. The new group email message may be a message originating from within the email server or from an external server. In Step 401, a group email message directed to multiple destination email addresses is received. One or more packets having the email message is received via a network and routed to the transport service. The email message may have an alias of a group of destination email addresses and/or may explicitly identify a set of destination email addresses. If an alias is used, the transport service resolves the alias to identify the destination email addresses.

In Step 403, system and email mailbox parameters for users and email addresses are obtained. The system and email mailbox parameters are obtained from storage and define the routing and filtering for the group email message as related to each of the destination email addresses.

In Step 405, a destination email address is selected. For the selected destination email address, email message preprocessing and routing is performed based on the system and email mailbox parameters in Step 407. For example, the routing and filtering may include security filtering, removing images and other attachments, relating the email to a particular folder identifier, etc. In some embodiments, the email body is analyzed to determine whether the email is a call to perform an action. The analysis may be a keyword analysis, or a more complex analysis based on machine learning, such as by applying a recurrent neural network to identify the meaning of one or more sentences in the email. If the email is a call to perform an action, then an action label is related to the email.

In Step 409, an initial label is added to the group email message. The initial label is a default label. For example, the initial label may be a normal importance, a blank label, action incomplete in the action label, or other default label.

In Step 411, the group email message is stored with the initial label in the email mailbox corresponding to the destination email address to obtain a stored email message. In other words, the email message is stored in physical storage and related to the email mailbox. In one or more embodiments, a copy of the email message and the initial label is stored in the email mailbox.

In Step 413, a determination is made whether another destination address exists in the group email message. Steps 405-411 are performed for each destination email address identified in the group email message. The result is a collection of email messages that are related to an initial label in various recipients' email mailboxes.

In some embodiments, as part of storing the email, group information and trusted circle information is obtained to determine which email mailboxes may cause an update of the label for a particular email mailbox. Specifically, not all recipients of the email may cause an updated label to the target email mailbox in one or more embodiments. Rather, only the trusted circle of recipients may cause the updated label. The trusted circle of recipients are determined based on the destination email addresses of the recipients. In such embodiments, the destination email addresses of the group email message are compared against parameters describing the source email mailboxes that may be used to update the label in order to identify a subset of the destination email addresses that may update the label. A group identifier of the subset may be linked, in storage, to the group email message when the group email message is stored. In other embodiments, the comparison is performed when an updated label to the group email message is generated.

For example, consider the scenario in which user A having email address A@mycompany.com, user B having email address B@mycompany.com, and user C having email address C@mycompany.com are in the trusted circle of user X. A group email is sent to destination email addresses A@mycompany.com, X@mycompany.com, and F@mycompany.com. Based on the parameters of X@mycompany.com and a comparison with destination email addresses, a determination is made that when user A updates the label for the group email, the updated label is propagated to the group email in X email mailbox. Similarly, depending on the parameters of user A's email mailbox and user F email mailbox, updated labels from user X may be propagated.

Turning to FIG. 5, FIG. 5 is a flowchart for updating a label in a target email mailbox. FIG. 5 may be performed asynchronously with the Steps of FIG. 4. In Step 501, a request for one or more store email messages are received. For example, an email client or web interface may send the message to the client access manager. In Step 503, the one or more stored email messages are transmitted from storage of the data repository to the user computing device. For example, the client access manager may access the corresponding email mailbox and send the email messages to the email client or web interface. The web interface may send the email messages or a list thereof to the web browser. When the email messages are sent, the labels for the group email messages may also be sent.

In Step 505, an updated label and email message identifier is received for a group email message. The user computing device receives an updated label from the recipient. The email mailbox from which the updated label is received is the source email mailbox for the updated label. The email message identifier identifies the email message in the source email mailbox for which the updated label is received. The updated label is stored with the group email message in the source email mailbox. Further, based on the updated label, the possible target email mailboxes having the same group email message are next identified.

In Step 507, based on the email message identifier, the destination email addresses of the group email message are identified. In other words, the group email message in the source email mailbox is identified from the email message identifier. The destination email addresses may be extracted from the group email message in the source email mailbox.

In Step 509, from storage, email mailbox parameters matching the destination email addresses is accessed. The destination email addresses in the email message reference the possible target email mailboxes. For each possible target email mailbox, the email mailbox parameters that define whether the target email mailbox will accept an updated label from the source email mailbox is obtained.

In Step 511, for each destination email address and according to the email mailbox parameters, an updated label is stored with the group email message. If the email mailbox parameters indicate that the target email mailbox does not accept an updated label from the source email mailbox, then the label in the target email mailbox is not updated. If the email mailbox parameters indicate that the target email mailbox does accept an updated label from the source email mailbox, then the label in the target email mailbox is updated. In some embodiments, the email mailbox parameters may specify to apply a voting scheme. In such a scenario, the updated label from the source email mailbox is treated as a vote and the votes are tallied to obtain a tally. The tally is the updated label or is sent with the updated label. Accordingly, a tally is stored with the updated label. After performing Step 511, at least a subset of the possible target email mailboxes has an updated label associated with the group email message.

As described above, users may not want their email mailboxes receive an updated label from all other possible recipients. The email server may use clustering techniques to learn a trusted circle for an email mailbox.

FIG. 6 shows a flowchart for learning a trusted circle for an email mailbox. In Step 601, an organization hierarchy is obtained. The organization hierarchy may be obtained from storage. In Step 603, email distribution statistics, email reading statistics, and retention statistics are obtained for email mailboxes. Over the course of users using mailboxes, the user manager obtains distribution statistics describing the frequency at which one or more of the same destination email addresses are on the same group email message. For example, users working on a same project may have email mailboxes more frequently identified together on group email messages than the email mailboxes of users working on different projects. The email reading statistics the reading times for group emails and whether a user retains emails or puts emails in particular folders.

In Step 605, the email mailboxes are clustered based on distribution statistics, and group reading and retention statistics to obtain one or more clusters for an email mailbox. The goal of the clustering is to cluster email mailboxes based on whether users would relate the same label to an email message. The clusters are the trusted circles. Various clustering algorithms may be used. For example, a neural network model may be applied, whereby the various statistics obtained in Step 604 are used as features to the model. The weights of the features are learned through machine learning. For example, a user may explicitly remove another user from a cluster. As another example, a user may continually update a label that is previously updated by another user. The user re-updating the label may be used as input to the neural network to change the weights. In addition to the above, and AI/ML component gives suggestions of trusted parties in the community based on common behavior. For instance, if Jim typically arrives at the office 3 hours before James and goes over the emails which have accumulated over the night first thing in the morning, and if the system also detects that Jim tends to delete the same emails as James do, then James should add Jim as a trusted spam detector.

In Step 607, the trusted circle is set based on the clusters and the organization hierarchy. The clusters are initial versions of the trusted circle. The organization hierarchy may be used to remove users from the trusted circles or add users to the trusted circles based on rules. For example, managers may be added to a trusted circle while subordinates are removed.

FIGS. 7-10 show example interfaces in accordance with one or more embodiments. The following examples are for explanatory purposes only and not intended to limit the scope of the invention.

FIG. 7 shows a GUI (700) with a group email message (702) in an email mailbox. The group email message (702) is, in the interface, visually related to a label field (704) showing an initial label. The initial label displays the message, "Click here to suggest community spam." When the user selects the "Click here . . . ," an updated label is generated suggesting that the email is community spam. The email mailbox of FIG. 7 is the source email mailbox for the updated label.

FIG. 8 continues the example of FIG. 7. In particular, FIG. 8 shows a GUI (800) generated for a target email mailbox that is different than the source email mailbox of FIG. 7. The GUI (800) as the same group email message (802) and is also visually related to a label field (804) showing the updated label. In the example, voting is used. Accordingly, the updated label indicates that the email may be declared as community spam and asks whether the recipient agrees.

Figure 9:
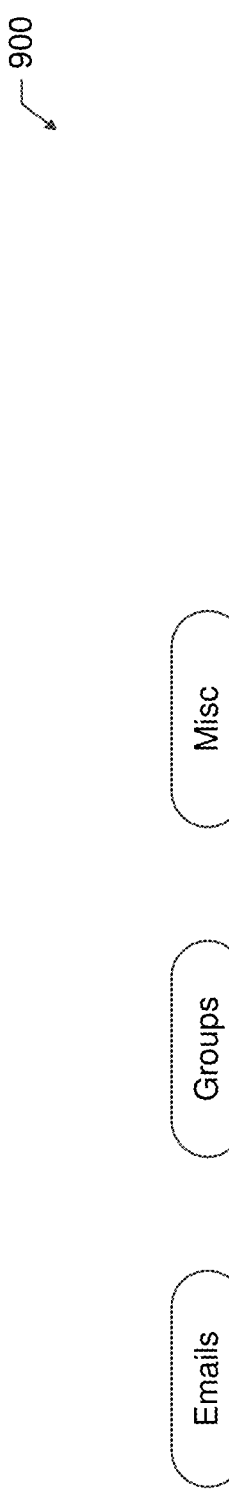

FIG. 9 shows an example interface (900) of an email mailbox listing group email messages in a spam folder. The group email messages are added to the spam folder from other recipients based on the updated labels from the other recipients identifying the group email messages as spam. Statistics about the open rate, score, and a timestamp of when the email is declared spam is also presented.

FIG. 10 shows an example interface (1000) listing groups of an email mailbox. The interface shows the member, people designated as leaders, an action or policy to enforce for the group emails, and other information. The misses are the percentage of group email messages in which the label is updated, the method is the technique by which an email message is labeled as spam, such as the number of members needed. The policy is the action to perform on emails that were voted as spam for the specific group. In the example, the voted off emails would be delivered as a weekly concatenation of voted of emails (1002) or be deleted and accessible via 'Slack' productivity tool (1004).

Figure 11A:
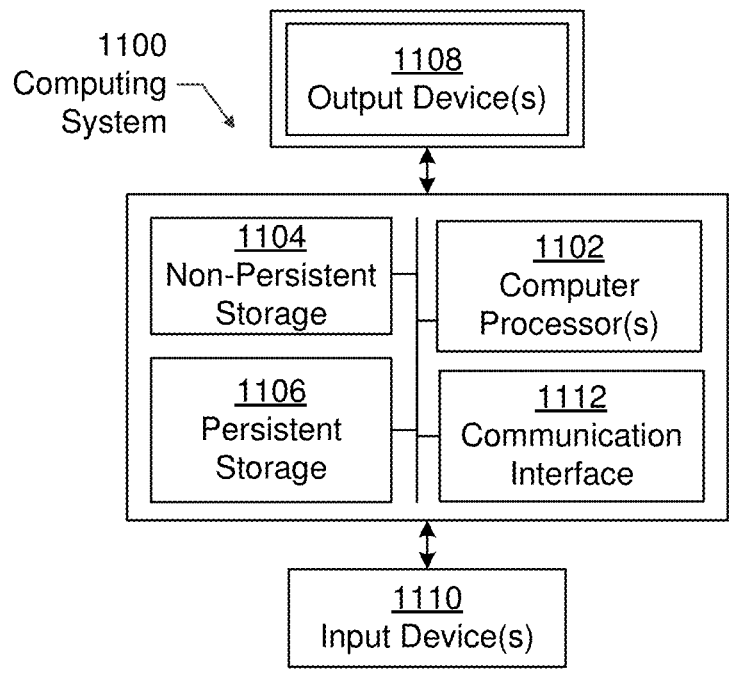
FIG. 11A and FIG. 11B show a computing system in accordance with one or more embodiments of the invention.

Embodiments of the invention may be implemented on a computing system. Any combination of mobile, desktop, server, router, switch, embedded device, or other types of hardware may be used. For example, as shown in FIG. 11A, the computing system (1100) may include one or more computer processors (1102), non-persistent storage (1104) (e.g., volatile memory, such as random access memory (RAM), cache memory), persistent storage (1106) (e.g., a hard disk, an optical drive such as a compact disk (CD) drive or digital versatile disk (DVD) drive, a flash memory, etc.), a communication interface (1112) (e.g., Bluetooth interface, infrared interface, network interface, optical interface, etc.), and numerous other elements and functionalities.

The computer processor(s) (1102) may be an integrated circuit for processing instructions. For example, the computer processor(s) may be one or more cores or micro-cores of a processor. The computing system (1100) may also include one or more input devices (1110), such as a touchscreen, keyboard, mouse, microphone, touchpad, electronic pen, or any other type of input device.

The communication interface (1112) may include an integrated circuit for connecting the computing system (1100) to a network (not shown) (e.g., a local area network (LAN), a wide area network (WAN) such as the Internet, mobile network, or any other type of network) and/or to another device, such as another computing device.

Further, the computing system (1100) may include one or more output devices (1108), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (1102), non-persistent storage (1104), and persistent storage (1106). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the invention.

Figure 11B:
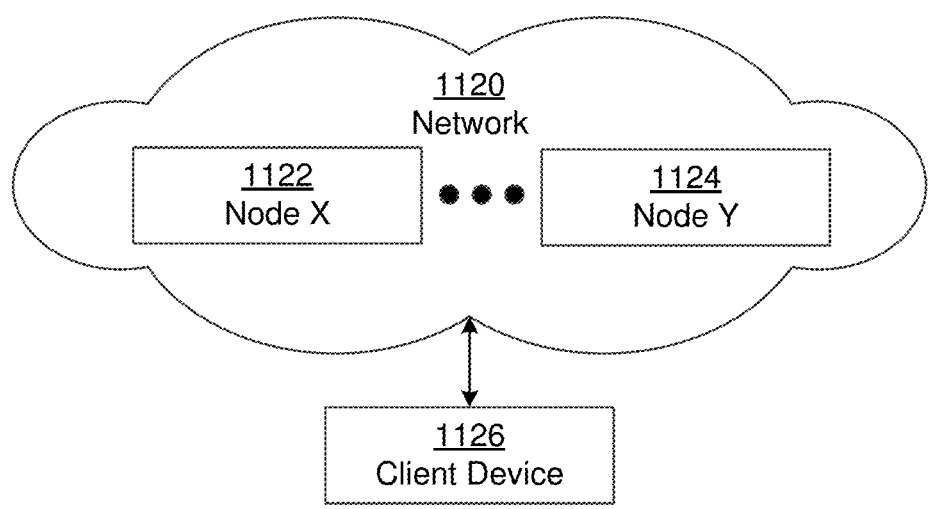

The computing system (1100) in FIG. 11A may be connected to or be a part of a network. For example, as shown in FIG. 11B, the network (1120) may include multiple nodes (e.g., node X (1122), node Y (1124)). Each node may correspond to a computing system, such as the computing system shown in FIG. 11A, or a group of nodes combined may correspond to the computing system shown in FIG. 11A. By way of an example, embodiments of the invention may be implemented on a node of a distributed system that is connected to other nodes. By way of another example, embodiments of the invention may be implemented on a distributed computing system having multiple nodes, where each portion of the invention may be located on a different node within the distributed computing system. Further, one or more elements of the aforementioned computing system (1100) may be located at a remote location and connected to the other elements over a network.

Although not shown in FIG. 11B, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (1122), node Y (1124)) in the network (1120) may be configured to provide services for a client device (1126). For example, the nodes may be part of a cloud computing system. The nodes may include functionality to receive requests from the client device (1126) and transmit responses to the client device (1126). The client device (1126) may be a computing system, such as the computing system shown in FIG. 11A. Further, the client device (1126) may include and/or perform all or a portion of one or more embodiments of the invention.

The computing system or group of computing systems described in FIGS. 11A and 11B may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file. Further details pertaining to a couple of these non-limiting examples are provided below.

Based on the client-server networking model, sockets may serve as interfaces or communication channel endpoints enabling bidirectional data transfer between processes on the same device. Foremost, following the client-server networking model, a server process (e.g., a process that provides data) may create a first socket object. Next, the server process binds the first socket object, thereby associating the first socket object with a unique name and/or address. After creating and binding the first socket object, the server process then waits and listens for incoming connection requests from one or more client processes (e.g., processes that seek data). At this point, when a client process wishes to obtain data from a server process, the client process starts by creating a second socket object. The client process then proceeds to generate a connection request that includes at least the second socket object and the unique name and/or address associated with the first socket object. The client process then transmits the connection request to the server process. Depending on availability, the server process may accept the connection request, establishing a communication channel with the client process, or the server process, busy in handling other operations, may queue the connection request in a buffer until server process is ready. An established connection informs the client process that communications may commence. In response, the client process may generate a data request specifying the data that the client process wishes to obtain. The data request is subsequently transmitted to the server process. Upon receiving the data request, the server process analyzes the request and gathers the requested data. Finally, the server process then generates a reply including at least the requested data and transmits the reply to the client process. The data may be transferred, more commonly, as datagrams or a stream of characters (e.g., bytes).

Shared memory refers to the allocation of virtual memory space in order to substantiate a mechanism for which data may be communicated and/or accessed by multiple processes. In implementing shared memory, an initializing process first creates a shareable segment in persistent or non-persistent storage. Post creation, the initializing process then mounts the shareable segment, subsequently mapping the shareable segment into the address space associated with the initializing process. Following the mounting, the initializing process proceeds to identify and grant access permission to one or more authorized processes that may also write and read data to and from the shareable segment. Changes made to the data in the shareable segment by one process may immediately affect other processes, which are also linked to the shareable segment. Further, when one of the authorized processes accesses the shareable segment, the shareable segment maps to the address space of that authorized process. Often, only one authorized process may mount the shareable segment, other than the initializing process, at any given time.

Other techniques may be used to share data, such as the various data described in the present application, between processes without departing from the scope of the invention. The processes may be part of the same or different application and may execute on the same or different computing system.

Rather than or in addition to sharing data between processes, the computing system performing one or more embodiments of the invention may include functionality to receive data from a user. For example, in one or more embodiments, a user may submit data via a GUI (GUI) on the user device. Data may be submitted via the GUI by a user selecting one or more GUI widgets or inserting text and other data into GUI widgets using a touchpad, a keyboard, a mouse, or any other input device. In response to selecting a particular item, information regarding the particular item may be obtained from persistent or non-persistent storage by the computer processor. Upon selection of the item by the user, the contents of the obtained data regarding the particular item may be displayed on the user device in response to the user's selection.

By way of another example, a request to obtain data regarding the particular item may be sent to a server operatively connected to the user device through a network. For example, the user may select a uniform resource locator (URL) link within a web client of the user device, thereby initiating a Hypertext Transfer Protocol (HTTP) or other protocol request being sent to the network host associated with the URL. In response to the request, the server may extract the data regarding the particular selected item and send the data to the device that initiated the request. Once the user device has received the data regarding the particular item, the contents of the received data regarding the particular item may be displayed on the user device in response to the user's selection. Further to the above example, the data received from the server after selecting the URL link may provide a web page in Hyper Text Markup Language (HTML) that may be rendered by the web client and displayed on the user device.

Once data is obtained, such as by using techniques described above or from storage, the computing system, in performing one or more embodiments of the invention, may extract one or more data items from the obtained data. For example, the extraction may be performed as follows by the computing system in FIG. 11A. First, the organizing pattern (e.g., grammar, schema, layout) of the data is determined, which may be based on one or more of the following: position (e.g., bit or column position, Nth token in a data stream, etc.), attribute (where the attribute is associated with one or more values), or a hierarchical/tree structure (consisting of layers of nodes at different levels of detail-such as in nested packet headers or nested document sections). Then, the raw, unprocessed stream of data symbols is parsed, in the context of the organizing pattern, into a stream (or layered structure) of tokens (where each token may have an associated token "type").

Next, extraction criteria are used to extract one or more data items from the token stream or structure, where the extraction criteria are processed according to the organizing pattern to extract one or more tokens (or nodes from a layered structure). For position-based data, the token(s) at the position(s) identified by the extraction criteria are extracted. For attribute/value-based data, the token(s) and/or node(s) associated with the attribute(s) satisfying the extraction criteria are extracted. For hierarchical/layered data, the token(s) associated with the node(s) matching the extraction criteria are extracted. The extraction criteria may be as simple as an identifier string or may be a query presented to a structured data repository (where the data repository may be organized according to a database schema or data format, such as XML).

The extracted data may be used for further processing by the computing system. For example, the computing system of FIG. 11A, while performing one or more embodiments of the invention, may perform data comparison. Data comparison may be used to compare two or more data values (e.g., A, B). For example, one or more embodiments may determine whether A>B, A=B, A !=B, A<B, etc. The comparison may be performed by submitting A, B, and an opcode specifying an operation related to the comparison into an arithmetic logic unit (ALU) (i.e., circuitry that performs arithmetic and/or bitwise logical operations on the two data values). The ALU outputs the numerical result of the operation and/or one or more status flags related to the numerical result. For example, the status flags may indicate whether the numerical result is a positive number, a negative number, zero, etc. By selecting the proper opcode and then reading the numerical results and/or status flags, the comparison may be executed. For example, in order to determine if A>B, B may be subtracted from A (i.e., A−B), and the status flags may be read to determine if the result is positive (i.e., if A>B, then A−B>0). In one or more embodiments, B may be considered a threshold, and A is deemed to satisfy the threshold if A=B or if A>B, as determined using the ALU. In one or more embodiments of the invention, A and B may be vectors, and comparing A with B requires comparing the first element of vector A with the first element of vector B, the second element of vector A with the second element of vector B, etc. In one or more embodiments, if A and B are strings, the binary values of the strings may be compared.

The computing system in FIG. 11A may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, or data container (database, table, record, column, view, etc.), identifier(s), conditions (comparison operators), functions (e.g. join, full join, count, average, etc.), sort (e.g. ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The computing system of FIG. 11A may include functionality to present raw and/or processed data, such as results of comparisons and other processing. For example, presenting data may be accomplished through various presenting methods. Specifically, data may be presented through a user interface provided by a computing device. The user interface may include a GUI that displays information on a display device, such as a computer monitor or a touchscreen on a handheld computer device. The GUI may include various GUI widgets that organize what data is shown as well as how data is presented to a user. Furthermore, the GUI may present data directly to the user, e.g., data presented as actual data values through text, or rendered by the computing device into a visual representation of the data, such as through visualizing a data model.

For example, a GUI may first obtain a notification from a software application requesting that a particular data object be presented within the GUI. Next, the GUI may determine a data object type associated with the particular data object, e.g., by obtaining data from a data attribute within the data object that identifies the data object type. Then, the GUI may determine any rules designated for displaying that data object type, e.g., rules specified by a software framework for a data object class or according to any local parameters defined by the GUI for presenting that data object type. Finally, the GUI may obtain data values from the particular data object and render a visual representation of the data values within a display device according to the designated rules for that data object type.

Data may also be presented through various audio methods. In particular, data may be rendered into an audio format and presented as sound through one or more speakers operably connected to a computing device.

Data may also be presented to a user through haptic methods. For example, haptic methods may include vibrations or other physical signals generated by the computing system. For example, data may be presented to a user using a vibration generated by a handheld computer device with a predefined duration and intensity of the vibration to communicate the data.

The above description of functions presents only a few examples of functions performed by the computing system of FIG. 11A and the nodes and/or client device in FIG. 11B. Other functions may be performed using one or more embodiments of the invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method comprising:
storing a group email message in a plurality of email mailboxes to obtain a plurality of stored email messages;
receiving, for a first stored email message in the plurality of stored email messages, an updated label from a first user computing device;
detecting, in response to receiving the updated label, that the plurality of stored email messages matches the first stored email message;
storing the updated label with at least a subset of the plurality of stored email messages; and
transmitting, with the updated label and to a second user computing device, a second stored email message in the plurality of stored email messages.

2. The method of claim 1, further comprising:
for each target email mailbox of the plurality of email mailboxes that stores at least one of the plurality of stored email messages,
obtaining an email mailbox parameter of the target email mailbox;
determining, from the email mailbox parameter, whether the first stored email message is in a source email mailbox that is in a trusted circle with the target email mailbox; and
adding a target stored email message stored in the target email mailbox to the at least the subset of the plurality of stored email messages, the target stored email message being in the plurality of stored email messages.

3. The method of claim 1, further comprising:
moving the second stored email message to a new folder in response to the updated label.

4. The method of claim 3, wherein moving the second stored email message comprises:
applying a rule to move the second stored email message to the new folder, wherein the folder is at least one selected from a group consisting of a spam folder and a delete folder, and wherein the rule uses as input a user identifier of a user matching the first stored email message.

5. The method of claim 1, further comprising:
assigning a priority level to the at least the subset of the plurality of stored email messages based on the updated label; and
receiving a request from the second user computing device for a plurality of email messages in an email mailbox of the plurality of email mailboxes, the second stored email message being in the plurality of email messages;
ordering the second stored email message within the plurality of email messages according to the priority level to create an ordering,
wherein the second stored email message is transmitted according to the ordering.

6. The method of claim 1, further comprising:
receiving a plurality of votes for an updated label for at least a subset of the plurality of email mailboxes, wherein receiving, from the first user computing device, the updated label comprises receiving a vote for the updated label, the vote being in the plurality of votes; and
tallying the plurality of votes to obtain a tally,
wherein transmitting the second stored email message is with the tally.

7. The method of claim 1, further comprising:
detecting that the group email message is a request to complete an action; and
sending to the first user computing device an initial label identifying the action as incomplete, wherein the updated label indicates that the action is complete.

8. The method of claim 1, further comprising:
obtaining a plurality of email distribution statistics, a plurality of email reading statistics, and a plurality of retention statistics for a plurality of email mailboxes;
clustering the plurality of email mailboxes into a plurality of clusters based on the plurality of email distribution statistics, the plurality of email reading statistics, and the plurality of retention statistics to obtain a plurality of clusters;
setting a trusted circle for a second email mailbox based on the plurality of clusters, the second email mailbox corresponding to the second stored email message,
wherein transmitting the updated label with the second stored email message is in response to a first email mailbox being in the trusted circle of the second email mailbox, the first email mailbox corresponding to the first stored email message.

9. The method of claim 8, further comprising:
obtaining an organizational hierarchy of a business organization,
wherein the trusted circle is further set based on the organizational hierarchy.

10. A non-transitory computer readable medium comprising computer readable program code for a graphical user interface, the graphical user interface comprising:
a list of a plurality of email messages in a first email mailbox, the plurality of email messages comprising a group email message directed to a plurality of destination email addresses, wherein the first email mailbox is assigned a first destination email address of the plurality of destination email addresses;
a label field assigned, in the graphical user interface, to the group email message; and
instructions for updating a label field with an updated label received from a second email mailbox, wherein the second email mailbox is assigned a second destination email address of the plurality of destination email addresses.

11. The non-transitory computer readable medium of claim 10, wherein the graphical user interface further comprises:
instructions for moving the group email message to a new folder in response to the updated label.

12. The non-transitory computer readable medium of claim 11, wherein the graphical user interface further comprises:
instructions for applying a rule to move the group email message to the new folder, wherein the new folder is at least one selected from a group consisting of a spam folder and a delete folder, and wherein the rule uses as input a user identifier of a user matching the second destination email address.

13. The non-transitory computer readable medium of claim 10, wherein the graphical user interface further comprises:
instructions for displaying the plurality of email messages according to a priority level individually assigned to each of the plurality of email messages, wherein the updated label changes the priority level assigned to the group email message.

14. The non-transitory computer readable medium of claim 10, wherein the graphical user interface further comprises:
a tally assigned, in the graphical user interface, to the group email message, the tally based on a plurality of votes for the updated label from at least a subset of a plurality of email mailboxes corresponding to the plurality of destination email addresses.

15. The non-transitory computer readable medium of claim 10, wherein the graphical user interface comprises:
an initial label in the label field displaying that an action requested by the group email message is incomplete, wherein the updated label displays that the action is incomplete.

16. A system comprising:
a computer processor;
a data repository storing a plurality of email mailboxes, the plurality of email mailboxes comprising a first email mailbox and a second email mailbox;
a transport service configured to execute on the computer processor and access the data repository, the transport service configured to:
  store a group email message in a plurality of email mailboxes to obtain a plurality of stored email messages; and
a client access service configured to execute on the computer processor and access the data repository, the client access service configured to:
  receive, for a first stored email message in the plurality of stored email messages, an updated label from a first user computing device,
  detect, in response to receiving the updated label, that the plurality of stored email messages matches the first stored email message,
  store the updated label with at least a subset of the plurality of stored email messages, and
  transmit, with the updated label and to a second user computing device, a second stored email message in the plurality of stored email messages.

17. The system of claim 16, further comprising:
a user manager configured to:
  obtain a plurality of email distribution statistics, a plurality of email reading statistics, and a plurality of retention statistics for a plurality of email mailboxes;
  cluster the plurality of email mailboxes into a plurality of clusters based on the plurality of email distribution statistics, the plurality of email reading statistics, and the plurality of retention statistics to obtain a plurality of clusters;
  set a trusted circle for a second email mailbox based on the plurality of clusters, the second email mailbox corresponding to the second stored email message,
  wherein transmitting the updated label with the second stored email message is in response to a first email mailbox being in the trusted circle of the second email mailbox, the first email mailbox corresponding to the first email message.

18. The system of claim 17, wherein the user manager is further configured to:
obtain an organizational hierarchy of a business organization,
wherein the trusted circle is further set based on the organizational hierarchy.

19. The system of claim 16, wherein the client access service is further configured to:
assign a priority level to the at least the subset of the plurality of stored email messages based on the updated label; and
receive a request from the second user computing device for a plurality of email messages in an email mailbox of the plurality of email mailboxes;
order the second stored email message within the plurality of email messages according to the priority level to create an ordering,
wherein the second stored email message is transmitted according to the ordering.

20. The system of claim 16, wherein the client access service is further configured to:
detect that the group email message is a request to complete an action; and
send to the first user computing device an initial label identifying the action as incomplete, wherein the updated label indicates that the action is complete.

* * * * *